(12) United States Patent     (10) Patent No.: US 9,139,252 B2
Scolari     (45) Date of Patent: Sep. 22, 2015

(54) DUAL DRIVE SPROCKET PEDAL BIKE

(71) Applicant: Zike, LLC, Greenville, SC (US)

(72) Inventor: Nathan A. Scolari, Greenville, SC (US)

(73) Assignee: ZIKE, LLC, Greenville, SC (US)

(*) Notice: Subject to any disclaimer, the term of this patent is extended or adjusted under 35 U.S.C. 154(b) by 0 days.

(21) Appl. No.: 14/190,527

(22) Filed: Feb. 26, 2014

(65) Prior Publication Data

US 2014/0265218 A1     Sep. 18, 2014

Related U.S. Application Data

(60) Provisional application No. 61/800,294, filed on Mar. 15, 2013.

(51) Int. Cl.
*B62M 3/08* (2006.01)
*B62M 1/36* (2013.01)
*B62K 3/00* (2006.01)
*B62M 9/02* (2006.01)

(52) U.S. Cl.
CPC .................. *B62M 3/08* (2013.01); *B62K 3/002* (2013.01); *B62M 1/36* (2013.01); *B62M 9/02* (2013.01)

(58) Field of Classification Search
CPC ......... B62K 17/00; B62K 3/002; B62M 1/36; B62M 3/00; B62M 9/00; B62M 3/08; B62M 9/02
See application file for complete search history.

(56) References Cited

U.S. PATENT DOCUMENTS

| 7,784,808 B2 * | 8/2010 | Fan ............................... 280/221 |
| D638,485 S * | 5/2011 | Scolari et al. ................ D21/423 |
| 8,210,553 B2 | 7/2012 | Fan |
| 2007/0024019 A1 | 2/2007 | Tarlow et al. |
| 2009/0272225 A1 * | 11/2009 | Wells, Jr. .................. 74/665 GE |

FOREIGN PATENT DOCUMENTS

| DE | 3121010 A1 * | 12/1982 | ............... B62M 1/02 |
| DE | 102005019235 | * | 4/2006 | |
| FR | 002543098 A1 * | 9/1984 | ............... B62K 5/02 |
| FR | 2831131 A1 * | 4/2003 | ............... B62M 1/02 |
| FR | 2903376 A1 * | 1/2008 | ............... B62M 1/04 |
| WO | WO 0027690 A1 * | 5/2000 | |
| WO | WO 0202395 A1 * | 1/2002 | |
| WO | WO 2010020726 A1 * | 2/2010 | |

* cited by examiner

*Primary Examiner* — Anne Marie Boehler
*Assistant Examiner* — Maurice Williams
(74) *Attorney, Agent, or Firm* — McNair Law Firm, P.A.; Douglas W. Kim

(57) ABSTRACT

This invention is a bicycle for a standing rider including a frame, a drive support attached to a front support member having a front end and a rear end; a front crank arm rotationally attached to the front end of the drive support and attached to a front sprocket; a rear crank arm rotationally attached to the rear end of the drive support and attached to a rear sprocket; a pedal attached to the front crank arm and the rear crank arm so that when the crank arms rotate, the pedal remains parallel to the ground; a spacing member attached to the drive support and the mail support member so that the drive support is disposed parallel to the ground.

15 Claims, 5 Drawing Sheets

DUAL DRIVE SPROCKET PEDAL BIKE

BACKGROUND OF THE INVENTION (1) Field of the Invention

The present invention is directed to a drive system for a bicycle using a dual drive sprocket configuration with pedal board for providing additional support to the rider when powering the bicycle.

(2) Description of Related Art

The bicycle has been around as a means of transportation since the 19th century. Bicycles essentially work on a combination of gears and wheels with the riders providing necessary power for locomotion. Generally, two pedals are connected to a front gear that transfers rotational power from the rider to the rear hub of a rear wheel through a linkage such as a chain. Rotating the front gear causes the rear hub and ultimately the rear wheel to rotate providing locomotion. A front wheel is typically supported a fork connected to a frame. The front wheel also provides for steering by being attached to handlebars. A seat is typically included attached to the frame positioned generally between the front and rear wheels.

Typically, the rider of a bicycle is seated on the bicycle seat. However, there can be advantages to riding the bicycle in a standing position such as improved exercise, greater leverage for transferring power from the rider to the pedals and improved balance. U.S. Pat. No. 8,210,553 is one attempt to provide for a standing style bicycle and includes a chain installed between the two driving sprockets for rotating the two driving sprockets synchronously and a transmission sprocket driven by the sprockets to drive a rear chain to transfer power to the rear wheel. With the transmission of the two driving sprockets of this reference and the front chain, the first and second cranks can be rotated synchronously, so that when the left and right pedals are used, the pivot situated in the slide slots of the pedals will slide along the slide slots without hindering the stepping movement of the pedals. However, this configuration requires a complex arrangement between the front chains, transmission sprocket and rear chain to achieve smooth operation. Further, the transmission sprocket required that it have a sufficient height above the ground for clearance requiring a high center of gravity for the entire drive system.

United States Patent Application Publication 2007/0024019 is also an attempt to provide a standing step scooter. This reference describes a two and one half inch diameter back wheel gear, a drive chain attaching the small gear to the large gear, a left and right drive disk each having a shaft protruding outwardly from near the perimeter of the disk, a pair of step support bars including step platforms, each attached to the perimeter disk shaft, the end of each step support bar terminating in a roller wheel and corresponding tracks for each roller wheel to travel in.

U.S. Pat. No. 8,162,337 is also an attempt to provide a standing style bicycle and discloses self-propelled vehicle propelled by an elliptical drive train. This reference includes foot link assemblies that include a foot link, each with a foot platform, and a foot link coupler. At the rear of the elliptical bicycle, adjacent the rear wheel, are an adjustable stride length mechanism including adjustable crank arms, a drive sprocket, a crank arm bearing, a chain, a rear wheel sprocket, and a rear wheel hub. The drive system of the reference is generally disposed rearward and above the rear wheel.

It is an objective of the present invention to provide a frame for a standing type bicycle with platform pedals arranged in a manner to reduce the center of gravity for increased stability.

It is another object of the present invention to reduce the drive system profile by eliminating the need for multiple chains or complex crank arms and drive system.

BRIEF SUMMARY OF THE INVENTION

The above objections are accomplished by providing A bicycle for a standing rider comprising: a frame having a main support member, a front support member, a front fork and a rear fork; a drive support connected to the front fork; a spacer member connected to the main support and the drive support so that the drive support is generally parallel to the ground; a front drive sprocket rotatably connected to a front end of the drive support and a rear drive sprocket rotatably connected to a rear end of the drive support; a front crank arm attached to the front drive sprocket and a rear crank arm attached to the rear crank arm; a pedal attached to the front and rear crank arms so that when the front and rear drive sprockets rotate, the pedal remains generally parallel to the drive support; and, a chain that contacts the front drive sprocket, the rear drive sprocket, a tension roller and a rear hub so that when force is applied to the pedal, rotational force is transferred to the rear hub producing locomotion.

The invention can include a sum of the angle defined between the main support and the spacing member and the angle defined between the spacing member and the drive support is greater than 180°. The invention can include rear forks that extend rearward from the frame and are pivotally connected to the main support member at a rear fork axis and adjustable according to varying rear wheel diameters so that the drive support remains parallel to the ground regardless of the rear wheel diameter.

The invention can include a tension roller carried by the rear fork axis. The chain can contact more than 170° of the front drive sprocket and less than 100° of the rear drive sprocket. The length of the rear crank arm can be greater than half the length of the drive support. An area defined by the rotational path of the front crank arm can overlap the area defined by the rotational path of the rear crank arm. The overlap can be generally disposed in the middle of the drive support member.

The invention can include a rear portion of the pedal wherein the area defined by the rotational path of the rear portion is greater than the area defined by the rotational path of the rear crank arm.

BRIEF DESCRIPTION OF THE SEVERAL VIEWS OF THE DRAWINGS

The details of the present invention, both as to its structure and operation, are understood in part by study of the accompanying drawings which are referenced herein and in which like reference numerals refer to like parts and where.

DETAILED DESCRIPTION ON THE INVENTION

Figure 1:
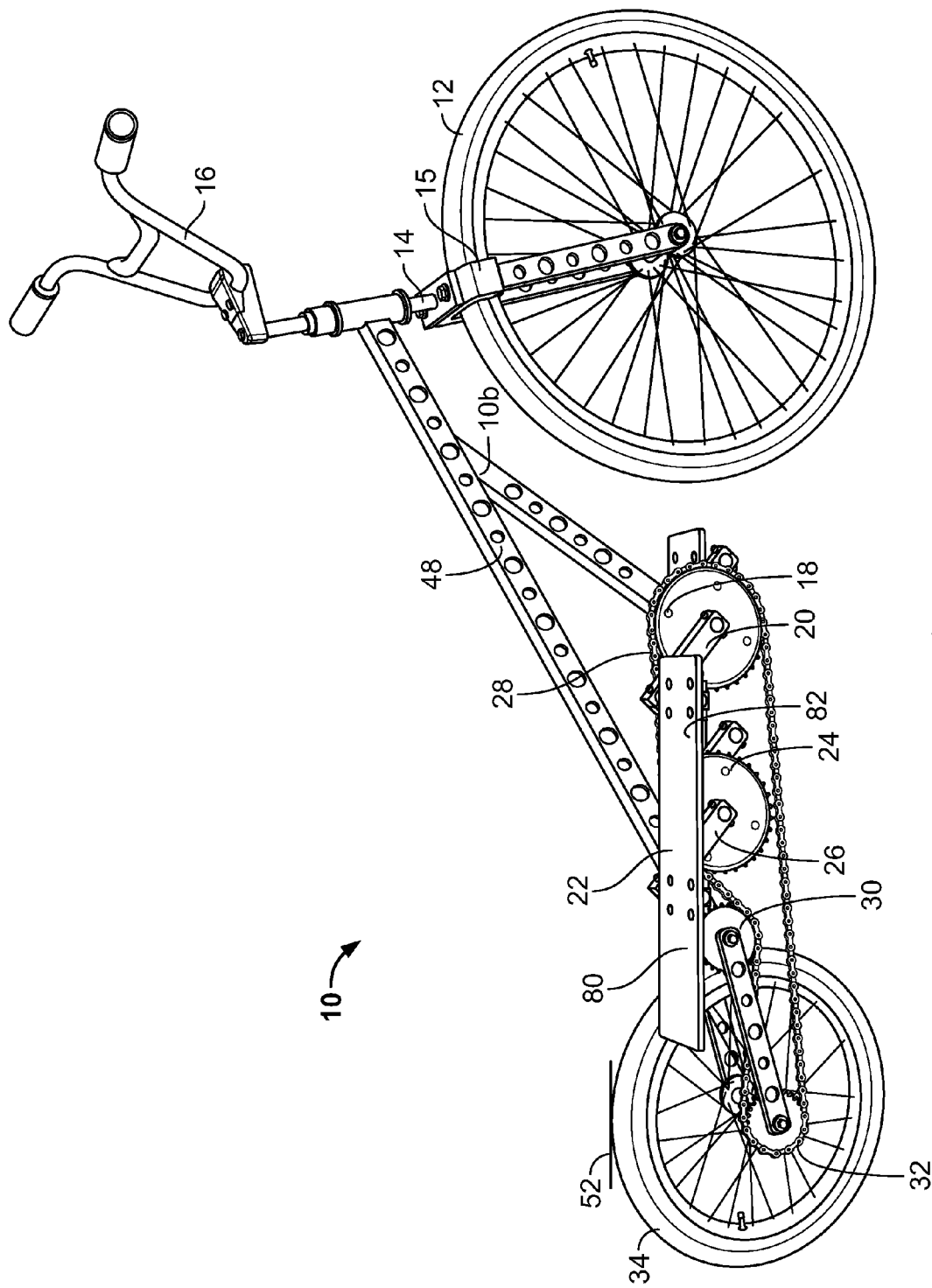
FIG. 1 is a perspective view of aspects of the invention.

Referring to FIG. 1, a frame 10 is shown with a steerable front wheel 12 carried by a shaft 14, forks 15 and handle bar 16. The frame includes a main support member 46 and front support member 48. A first pedal sprocket 18 is rotatably connected to the frame. A first crank arm 20 is connected to the first pedal sprocket and rotatably connected to a right pedal board 22. A second pedal sprocket 26 is rotatably connected to the frame and disposed rearward of the first pedal sprocket. A second crank arm is attached to the second pedal sprocket and rotatably attached to the right pedal board. A tension roller 30 contacts chain 28 and places tension on the chain. In one embodiment, the tension is a sprocket. The chain couples the first pedal sprocket and the second pedal sprocket with a drive sprocket 32 so that rotational force is transferred from the pedal boards to the pedal sprockets to the rear wheel 34.

Figure 5:
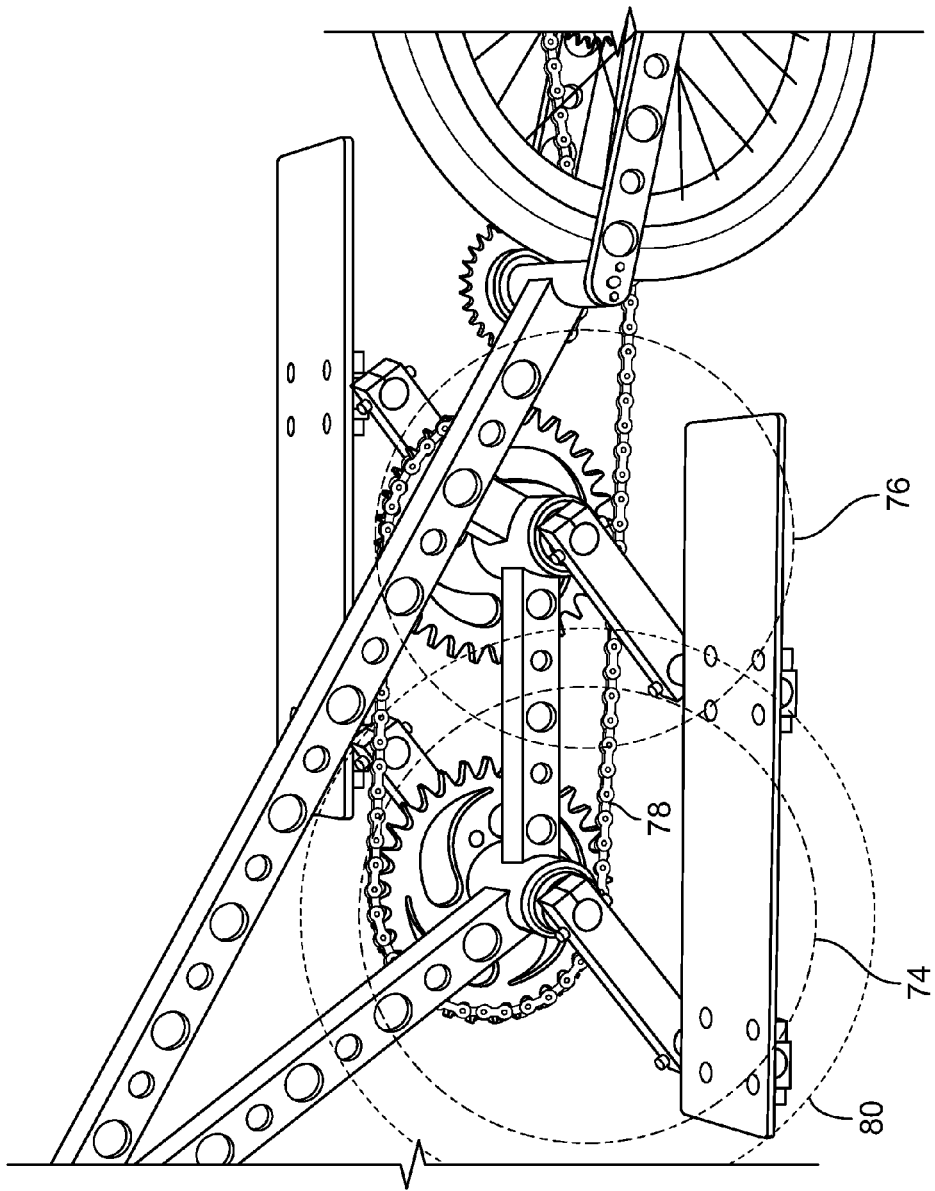
FIG. 5 is a side view of aspects of the present invention.

The first crank arm and the second crank arm are connected to the pedal board in a linear arrangement so that when the sprockets rotate, the pedal board is generally parallel to the ground throughout the pedal cycle thereby providing a stable support platform for the rider so that a seat is unnecessary. The platform also provides an even distribution of downward pressure on the first and second crank arms. In one embodiment, the platform can include a front end 82 and a rear end 80. The front end can be connected to the front crank arm so that the rotational path of the front end of the pedal is generally superimposed on the rotational path of the front crank arm (FIG. 5). The rear end of the pedal can extend past the point where it is connected to the rear crank arm so that the rotational area of the rear portion of the pedal is greater than the rotational area of the rear crank arm.

Figure 2:
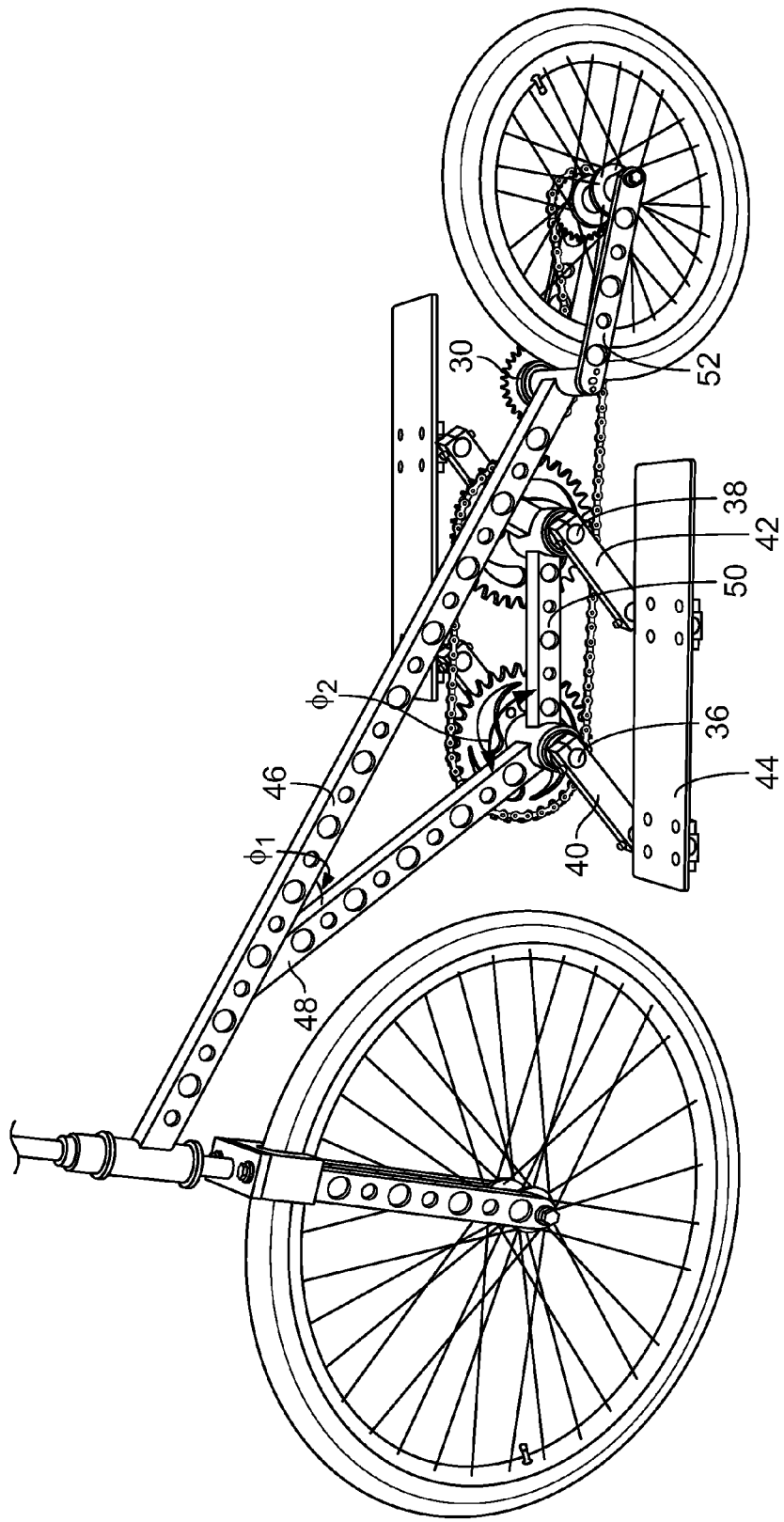
FIG. 2 is a perspective view of the present invention.

Referring to FIG. 2, the left side of the invention is shown. A first axle 36 is connected to the first pedal sprocket so that when the sprocket rotates, the axle rotates. A second axle 38 is attached to the second sprocket so that when the second pedal sprocket rotates, the second axle rotates. A first left crank arm 40 is attached to the first axle and rotatably attached to a left pedal board 44. A second left crank arm is attached to the second axle and rotatably attached to the left pedal board. The right pedal board and the left pedal board are disposed 180 degrees from each other. The crank arms of each side are disposed 180 degrees from each other.

The frame can include a main support member 46 that generally runs from the front of the frame to the rear. A front support portion 48 can be connected to the main support. A drive support 50 can be connected to the main support and the front support. A rear fork 52 can be connected to the frame. In one embodiment, the rear fork extends rearward from the frame further lowering the center of gravity of the present invention and improving the balance over the prior art. The configuration also provides a low profile frame at the rear of the bike allowing the rider freedom of movement with minimal interference from the frame itself.

In one embodiment, the main support member and the front support member define an angle $\square^1$ that is less than 9°. The front support member and the drive support define an angle $\square^2$ that is greater than 90°.

Figure 3:
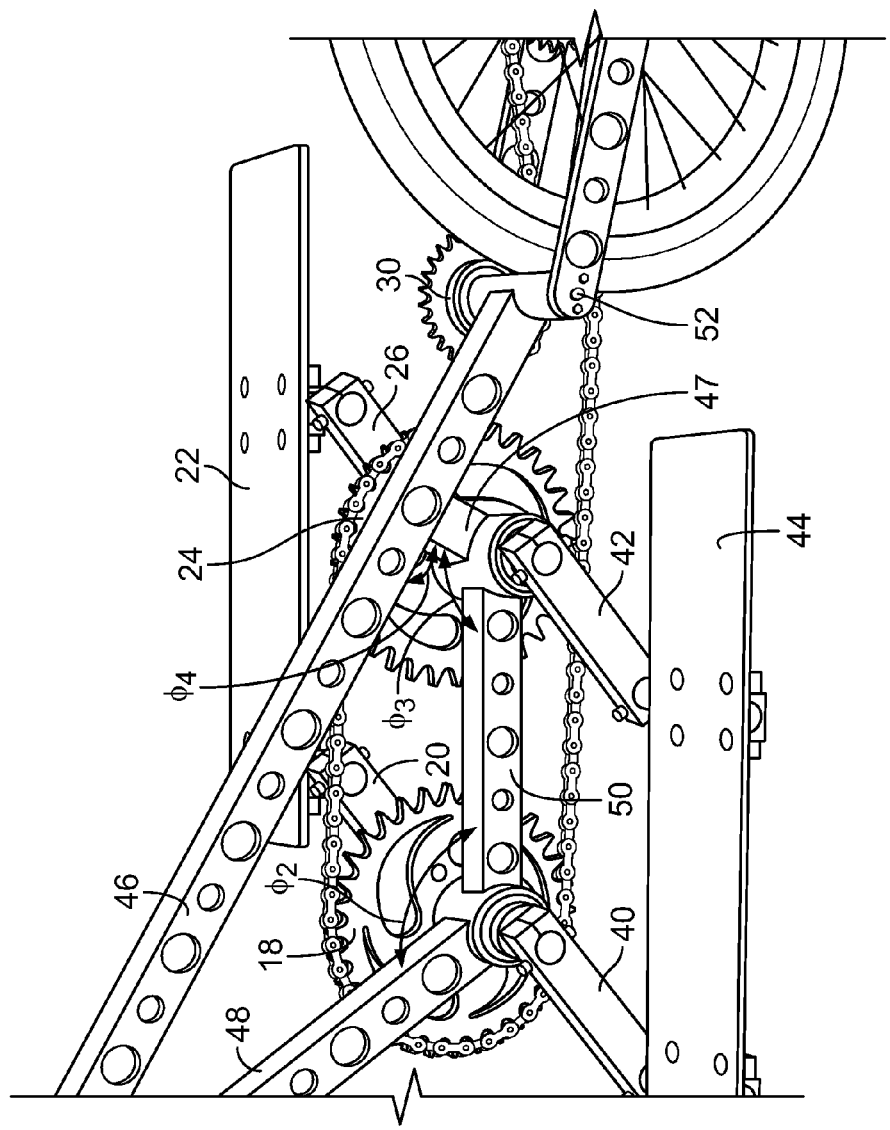
FIG. 3 is a perspective view of aspects of the present invention

Referring to FIG. 3, the main support member is shown connected to the drive support member. In one embodiment, the drive support member is connected to spacing member 47 so that the drive support member is arranged generally parallel to the ground when the invention is in operation. By using the spacing member, the drive support can be disposed lower than if the rear portion of the drive support was attached directly to the main support. Therefore, this arrangement provides for a lower center of gravity while also allowing necessary clearance of the pedal sprockets.

The main support and the spacing member can define an angle $\square^4$. In one embodiment, $\square^4$ is 90°. The drive support and the spacing member define angle $\square^3$ in one embodiment. In one embedment, $\square^3 + \square^4$ are greater than 180°. In one embodiment, $\square^3$ is greater than 90°. In the configuration shown in the Figures, the pedals rotate in a space defined by a horizontal line 52 that is tangent to the perimeter of the rear wheel.

The rear forks can be connected to the main support at an axis 52. The rear forks can be rotated about the axis to accommodate varying diameters of rear wheels so that the drive support remains parallel to the ground. The tension roller can be carried by the frame and attached at axis 52.

Figure 4A:
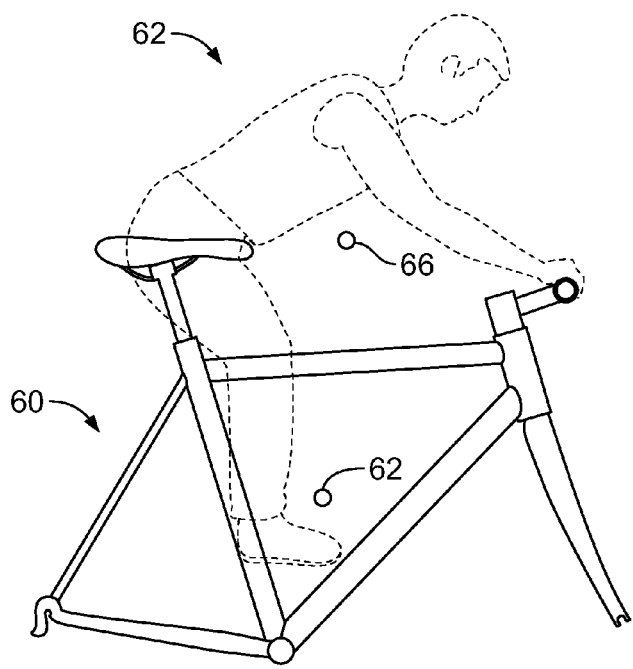
FIG. 4A is a side view of the prior art.
Figure 4B:
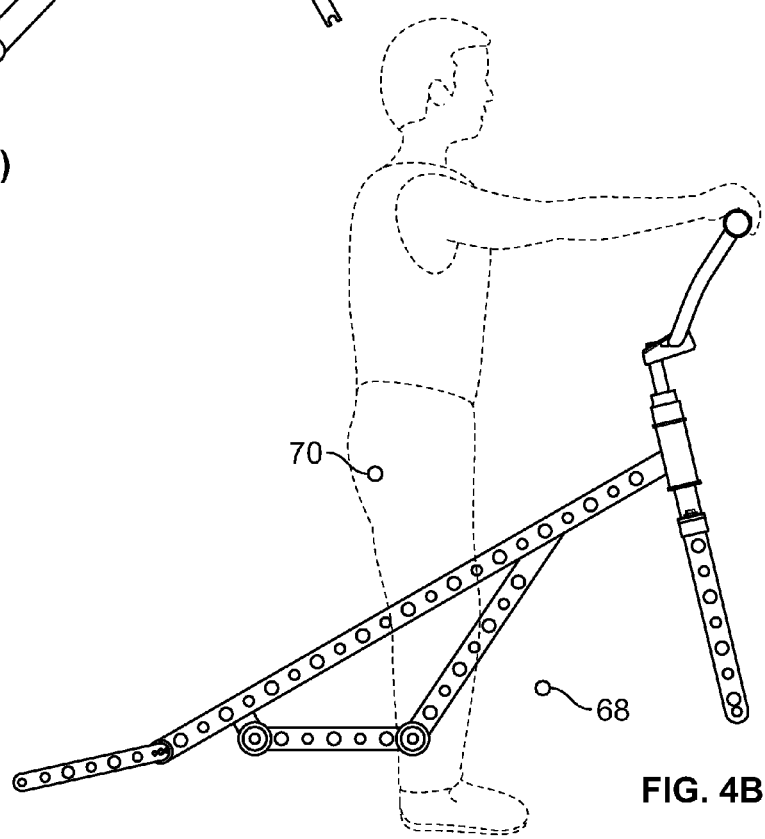
FIG. 4B is a side view of aspects of the present invention.

Referring to FIG. 4A, it is shown a bicycle frame 60 that is in the prior art. Without the rider, the center of gravity is shown as 62, which is approximately midline between the top and bottom of the frame. When a rider 62 is riding the bicycle, the center of gravity (center of mass) rises, accounting for the mass of the rider, and is shown as 66. Due to the mass of the rider, the center of gravity of the rider combined with the frame is above the center of gravity of the frame alone. This significantly changes the balance of the frame. Referring to FIG. 4B, the frame of the presenting invention shows a center of gravity of 68 without a rider and 70 with the rider. In the present invention, the ability to keep the center of gravity low, even with a rider, allows the center of gravity to more approximate that of the rider without the frame so that the rider is better able to manage the balance of the vehicle. The center of gravity of the rider and frame is much more similar to the "feel" that the rider is naturally improving the stability and ease of riding the present invention.

Referring to FIG. 5, area 74 is defined by the rotational path of the rear crank arm. Area 76 is defined by the rotational path of the rear crank arm. The areas of the rotational crank arms overlap in an area shown as 78 allowing the first crank arm and second crank arm to cooperate without having to unnecessarily lengthen the drive support and thereby the frame. In one embodiment, the rear end of the pedal defines an area 80 in its rotational path. The area defined by the rotational path of the rear end of the pedal can be larger than the area defined by the rotational path of the rear crank arm. The area defined by the rotational path of the rear end of the pedal can be larger than the area defined by the rear wheel.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

Unless specifically stated, terms and phrases used in this document, and variations thereof, unless otherwise expressly stated, should be construed as open ended as opposed to limiting. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise.

Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

What is claimed is:

1. A bicycle for a standing rider comprising:
a frame having a main support member, a front support member, a front fork and a rear fork, wherein said rear fork extends rearward from the frame and is pivotally connected to the main support member at a rear fork axis and adjustable according to varying rear wheel diameters so that a drive support connected to said front fork remains parallel to the ground regardless of the rear wheel diameter;
a spacer member connected to said main support and said drive support so that said drive support is generally parallel to the ground;
a front drive sprocket rotatably connected to a front end of said drive support and a rear drive sprocket rotatably connected to a rear end of said drive support;
a front crank arm attached to said front drive sprocket and a rear crank arm attached to said rear drive sprocket;
a pedal attached to said front and rear crank arms so that when said front and rear drive sprockets rotate, said pedal remains generally parallel to said drive support; and,
a chain that contacts said front drive sprocket, said rear drive sprocket, a tension roller and a rear hub so that when force is applied to said pedal, rotational force is transferred to said rear hub producing locomotion.

2. The apparatus of claim 1 wherein the sum of the angle defined between the main support and the spacing member and the angle defined between the spacing member and the drive support is greater than 180°.

3. The apparatus of claim 1 wherein said tension roller is carried by said rear fork axis.

4. The apparatus of claim 1 wherein said chain contacts more than 170° of the front drive sprocket and less than 100° of the rear drive sprocket.

5. The apparatus of claim 1 wherein the length of said rear crank arm is greater than half the length of said drive support.

6. The apparatus of claim 1 wherein the area defined by the rotational path of the front crank arm overlaps the area defined by the rotational path of the rear crank arm.

7. The apparatus of claim 6 wherein the overlap is generally positioned in the middle of the drive support member.

8. The apparatus of claim 1 including a rear portion of said pedal wherein the area defined by the rotational path of said rear portion is greater than the area defined by the rotational path of the rear crank arm.

9. A bicycle for a standing rider including a frame having a main support member, a front support member, a rotationally attached front fork, handle bars carried by said frame for pivoting said front fork and a front wheel rotatably attached to said front fork comprising:
a drive support attached to said front support member having a front end and a rear end;
a front crank arm rotationally attached to said front end of said drive support and attached to a front sprocket;
a rear crank arm rotationally attached to said rear end of said drive support and attached to a rear sprocket;
a pedal attached to said front crank arm and said rear crank arm so that when said crank arms rotate, said pedal remains parallel to the ground;
a spacing member attached to said drive support and said main support member so that said drive support is disposed parallel to the ground;
a rear fork pivotally attached to an axis included in said main support member allowing said rear fork to be varied in height;
a rear hub attached to said rear fork and a rear wheel;
a chain connected to said front drive sprocket, said rear drive sprocket and said rear hub so that when force is applied to the pedal by the rider, the force is transferred from the pedal to the crank arms to the chain to the rear hub causing the rear wheel to turn.

10. The apparatus of claim 9 including a tension roller rotationally attached to said frame.

11. The apparatus of claim 9 wherein said chain contacts more than 170° of said front drive sprocket and less than 100° of said rear drive sprocket.

12. The apparatus of claim 9 wherein the length of each of said crank arms is greater than half the length of said drive support.

13. The apparatus of claim 9 wherein the area defined by the rotational path of the front crank arm overlaps the area defined by the rotational path of the rear crank arm.

14. The apparatus of claim 13 wherein the overlap is generally positioned in the middle of the drive support member.

15. The apparatus of claim 9 including a rear portion of said pedal wherein the area defined by the rotational path of said rear portion is greater than the area defined by the rotational path of the rear crank arm.

* * * * *